(12) United States Patent
Hu

(10) Patent No.: US 9,006,964 B2
(45) Date of Patent: Apr. 14, 2015

(54) FIELD EMISSION CATHODE

(75) Inventor: Qiu-Hong Hu, Göteborg (SE)

(73) Assignee: Lightlab Sweden AB, Stockholm (SE)

( * ) Notice: Subject to any disclaimer, the term of this patent is extended or adjusted under 35 U.S.C. 154(b) by 0 days.

(21) Appl. No.: 13/639,290

(22) PCT Filed: Apr. 4, 2011

(86) PCT No.: PCT/EP2011/055213
§ 371 (c)(1),
(2), (4) Date: Dec. 14, 2012

(87) PCT Pub. No.: WO2011/124555
PCT Pub. Date: Oct. 13, 2011

(65) Prior Publication Data
US 2013/0200776 A1 Aug. 8, 2013

(30) Foreign Application Priority Data

Apr. 6, 2010 (EP) .................................. 10159139

(51) Int. Cl.
*H01J 1/304* (2006.01)
*H01J 63/04* (2006.01)
(Continued)

(52) U.S. Cl.
CPC ............... *H01J 1/3044* (2013.01); *H01J 1/304* (2013.01); *H01J 31/123* (2013.01); *H01J 63/02* (2013.01); *H01J 63/04* (2013.01); *H01J 2201/3043* (2013.01); *H01J 2201/30446* (2013.01); *H01J 2201/30484* (2013.01); *H01J 2201/30488* (2013.01); *H01J 2201/30492* (2013.01); *H01J 2201/30496* (2013.01); *H01J 2329/0428* (2013.01); *H01J 2329/0439* (2013.01);

(Continued)

(58) Field of Classification Search
None
See application file for complete search history.

(56) References Cited

U.S. PATENT DOCUMENTS 5,877,588 A * 3/1999 Kaftanov et al. ............. 313/491
5,973,446 A * 10/1999 Kaftanov et al. ............. 313/310
(Continued)

FOREIGN PATENT DOCUMENTS

CN 1767122 A 5/2006
JP 05028972 B2 2/1993
(Continued)

OTHER PUBLICATIONS

Zhang Yang et al: "Cross-Disciplinary Physics and Related Areas of Science and Technology; Enhanced Field Emission from Vertical ZnO Nanoneedles on Micropyramids," Chinese Physics Letters, Institute of Physics Publishing, Bristol, GB, vol. 26, No. 3, Mar. 1, 2009, p. 38101, XP020150342, ISSN: 0256-307X, pp. 1-3, Figure 1.
(Continued)

*Primary Examiner* — Ashok Patel
(74) *Attorney, Agent, or Firm* — Harness, Dickey & Pierce, P.L.C.

(57) ABSTRACT

The present invention relates to a field emission cathode, comprising an at least partly electrically conductive base structure, and a plurality of electrically conductive micrometer sized sections spatially distributed at the base structure, wherein at least a portion of the plurality of micrometer sized sections each are provided with a plurality of electrically conductive nanostructures. Advantages of the invention include lower power consumption as well as an increase in light output of e.g. a field emission lighting arrangement comprising the field emission cathode.

19 Claims, 3 Drawing Sheets

(51) Int. Cl.
*H01J 31/12* (2006.01)
*H01J 63/02* (2006.01)
*B82Y 20/00* (2011.01)

(52) U.S. Cl.
CPC .. *H01J2329/0465* (2013.01); *H01J 2329/0468* (2013.01); *H01J 2329/0471* (2013.01); *H01J 2329/0473* (2013.01); *B82Y 20/00* (2013.01)

(56) References Cited

U.S. PATENT DOCUMENTS

| | | | | |
|---|---|---|---|---|
| 6,008,575 | A | * | 12/1999 | Kaftanov et al. ............. 313/484 |
| 7,462,499 | B2 | * | 12/2008 | Conley et al. ................. 438/20 |
| 2003/0058647 | A1 | | 3/2003 | Kokubo et al. |
| 2003/0111946 | A1 | * | 6/2003 | Talin et al. .................... 313/311 |
| 2006/0028111 | A1 | | 2/2006 | Park et al. |
| 2006/0192475 | A1 | | 8/2006 | Lee et al. |
| 2007/0099441 | A1 | | 5/2007 | Conley et al. |
| 2008/0164801 | A1 | | 7/2008 | Min et al. |
| 2009/0041986 | A1 | * | 2/2009 | Zhang et al. ................. 428/156 |
| 2009/0068411 | A1 | | 3/2009 | Hong et al. |
| 2009/0114618 | A1 | | 5/2009 | Zhang et al. |
| 2009/0114619 | A1 | | 5/2009 | Sotoaka et al. |
| 2009/0309481 | A1 | | 12/2009 | Chou et al. |
| 2010/0244661 | A1 | * | 9/2010 | Li et al. ........................ 313/494 |

FOREIGN PATENT DOCUMENTS

| | | | |
|---|---|---|---|
| JP | 2003100257 | A | 4/2003 |
| JP | 2005162571 | A | 6/2005 |
| JP | 2006049066 | A | 2/2006 |
| JP | 2006049322 | A | 2/2006 |
| JP | 2006156111 | A | 6/2006 |
| JP | 2006294387 | A | 10/2006 |
| JP | 2007172925 | A | 7/2007 |
| TW | 200805415 | A | 1/2008 |
| TW | 200828398 | A | 7/2008 |

OTHER PUBLICATIONS

Japanese Office Action issued in Japanese Patent Application No. 2013-503080 and dated Sep. 16, 2014.
Chinese Office Action issued in Chinese Patent Application No. 201180017218.2 and dated Sep. 18, 2014.
Taiwanese Search Report issued in Taiwanese Patent Application No. 100111874 and dated Sep. 29, 2014.

* cited by examiner

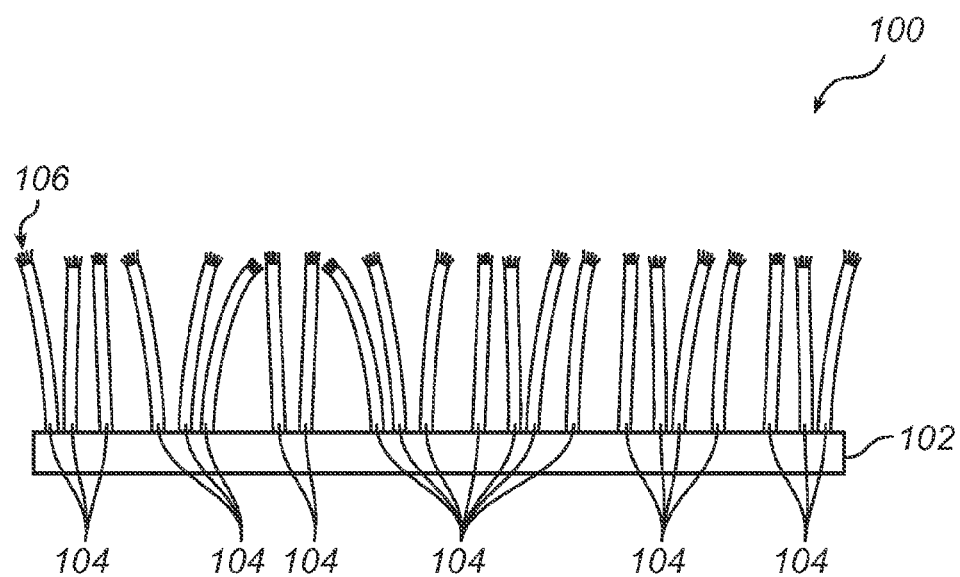
Fig. 1
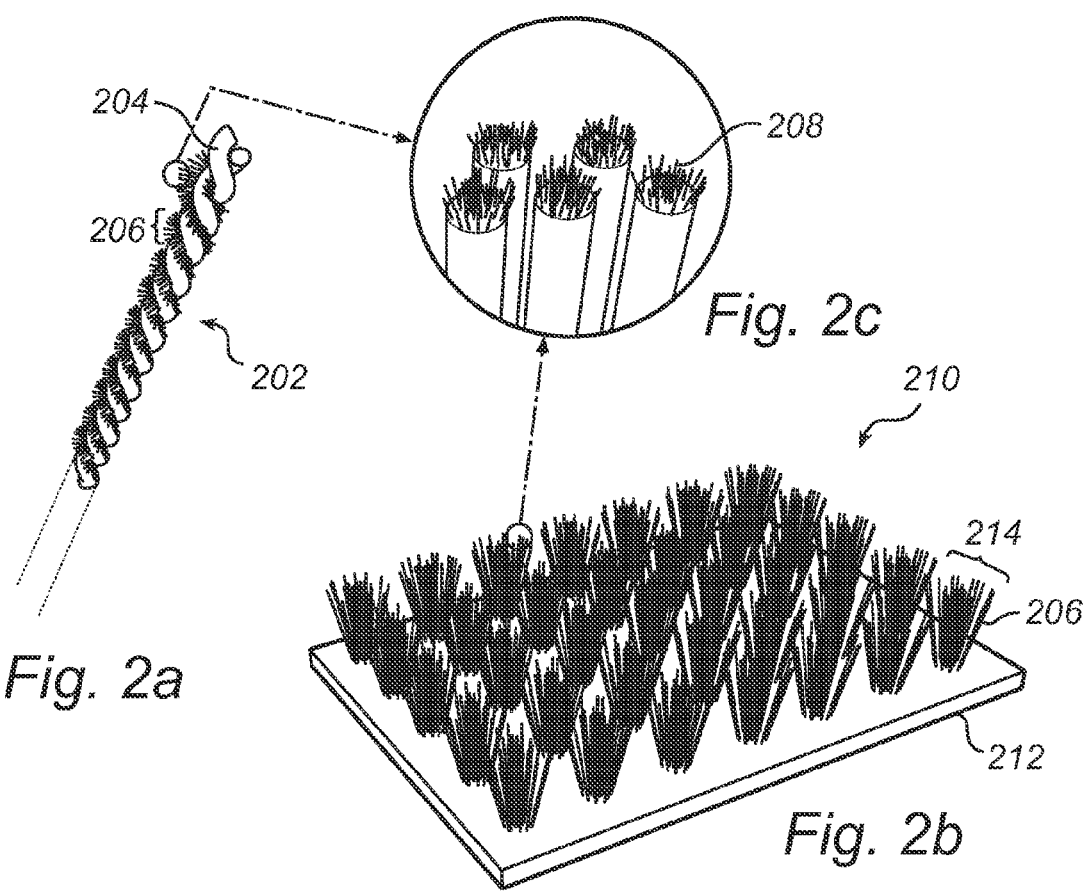
Fig. 2a
Fig. 2b
Fig. 2c

FIELD EMISSION CATHODE

CROSS-REFERENCE TO RELATED APPLICATIONS

This application is a 371 U.S. National Stage of International Application No. PCT/EP2011/055213, filed Apr. 4, 2011. This application claims the benefit of European Patent Application No. 10159139.4, filed Apr. 6, 2010. The disclosures of the above applications are herein incorporated by reference in their entirety.

TECHNICAL FIELD

The present invention relates to an arrangement for field emission cathode. More specifically, the invention relates to a cathode for a field emission lighting arrangement.

BACKGROUND OF THE INVENTION

There is currently a trend in replacing the traditional light bulb with more energy efficient alternatives. Florescent light sources also in forms resembling the traditional light bulb have been shown and are often referred to as compact fluorescent lamps (CFLs). As is well known, all florescent light sources contain a small amount of mercury, posing problems due to the health effects of mercury exposure. Additionally, due to heavy regulation of the disposal of mercury, the recycling of florescent light sources becomes complex and expensive.

Accordingly, there is a desire to provide an alternative to florescent light sources. An example of such an alternative is provided in WO 2005074006, disclosing a field emission light source containing no mercury or any other health hazardous materials. The field emission light source includes an anode and a cathode, the anode consists of a transparent electrically conductive layer and a layer of phosphors coated on the inner surface of a cylindrical glass tube. The phosphors are luminescent when excited by electrons. The electron emission is caused by a voltage between the anode and the cathode. For achieving high emission of light it is desirable to apply the voltage in a range of 4-12 kV.

The field emission light source disclosed in WO 2005074006 provides a promising approach to more environmentally friendly lighting, e.g. as no use of mercury is necessary. However it is always desirable to improve the design of the lamp to prolong the life time, and/or to increase the luminous efficiency of the lamp.

SUMMARY OF THE INVENTION

According to an aspect of the invention, the above is at least partly met by a field emission cathode, comprising an at least partly electrically conductive base structure, and a plurality of electrically conductive micrometer sized sections spatially distributed at the base structure, wherein at least a portion of the plurality of micrometer sized sections each are provided with a plurality of electrically conductive nanostructures.

In the context of this document, the term nanostructure is understood to mean a structure element with one or more dimensions of 100 nanometers (nm) or less, and a spatial arrangement of such elements. The term nanostructures include nanotubes, nanospheres, nanorods, nanofibers, and nanowires, where the nanostructures may be part of a nanonetwork. Furthermore, the term nanosphere means a nanostructure having an aspect ratio of at most 3:1, the term nanorod means a nanostructure having a longest dimension of at most 200 nm, and having an aspect ratio of from 3:1 to 20:1, the term nanofiber means a nanostructure having a longest dimension greater than 200 nm, and having an aspect ratio greater than 20:1, and the term nanowire means a nanofiber having a longest dimension greater than 1,000 nm.

Further definitions in relation to the nanostructures include the term aspect ratio, which means the ratio of the longest axis of an object to the shortest axis of the object, where the axes are not necessarily perpendicular. The term width of a cross-section is the longest dimension of the cross-section, and the height of a cross-section is the dimension perpendicular to the width. The term nanonetwork means a plurality of individual nanostructures that are interconnected.

As a comparison to prior art arrangements comprising nanostructures being grown on an essentially flat surface, the nanostructures according to the invention are instead provided on spatially distributed micrometer sized sections. Among other things, this has the advantage that it may be possible to provide an improved electron emission, for example when using the present field emission cathode in a field emission application. The improved electron emission is derived from the fact that the length of each of the individual nanostructures has less impact on the overall length provided by the micrometer sized sections in combination with the thereto arranged nanostructures. Accordingly, the micrometer sized sections will be the majority contributor for the total length, and the nanostructures will essentially only provide the micrometer sized sections with sharp tips of essence for achieving a high electron emission in a field emission application. An improvement in electron emission also lower power consumption in the case where the field emission cathode is comprised in a field emission arrangement, further allowing for an increased light output in case the field emission arrangement is a field emission light source and/or a field emission display.

For achieving an improved electron emission, the nanostructures preferably comprise nanostructures of at least one of conductive oxides, borides, nitrides, carbides, metallic alloys, silicides. Most preferably, the nanostructures comprise ZnO nanostructures. Also, at least a portion the pluralities of nanostructures have a shape of polygonal or circular cylinders, having a diameter between 5-500 nanometer and a length up to 500 nanometers.

The least partly electrically conductive base structure may comprise a matrix (or network) of interconnected of addressable conductors connecting to the micrometer sized sections. In between the conductors there may for example be provided insulating segments allowing groups or "clusters" of micrometer sized sections to be individually addressed. The base structure may be provided in different forms, for example arranged to comprise a wire, or being provided to comprise at least one of a grid, and a perforated or solid thin sheet, depending on the specific application in mind.

As discussed above, the micrometer sized sections are spatially distributed at the base structure. Preferably, for improving the electron emission, the micrometer sized sections are distributed with a distance exceeding an average diameter of the plurality of micrometer sized sections. The shape of the micrometer sized sections are preferably selected such that at least a portion of the plurality of micrometer sized sections have a shape of polygonal or circular cylinders, having a diameter between 5-500 micrometer and a length up to 10 millimeters, or at least having an aspect ratio of at least 3:1.

Depending on the application in mind, at least a portion of the plurality of micrometer sized sections preferably comprises an electrically conducting or semiconducting, optically transparent or reflecting material.

The field emission cathode according to the invention preferably forms part of a field emission arrangement, further to the above discussed field emission cathode comprising an anode structure and an evacuated envelope, for example in the form of a container comprising a transparent glass section. The field emission arrangement may for example be comprised in at least one of a field emission light source, a field emission display, an X-ray source.

The field emission cathode and the anode structure are both arranged inside of the evacuated envelop. Additionally, the anode structure may preferably be at least partly covered by a phosphor layer and comprising a thermally conductive material having a reflective coating. Such an arrangement is for example disclosed in EP09180339 by the same applicant and incorporated by reference in its entirety.

Furthermore, the anode structure is preferably configured to receive electrons emitted by the field emission cathode when a voltage is applied between the anode structure and field emission cathode and to reflect light generated by the phosphor layer out from the evacuated envelope, e.g. through the glass section of the above mentioned container. The voltage is preferably in the range of 2-12 kV The voltage may for example be provided by a power supply comprised with the field emission arrangement, e.g. arranged together with (such as for example within a socket in the case the field emission arrangement is a field emission light source) with or in the vicinity of the field emission arrangement. The power supply may be connected to the field emission cathode and the anode structure and configure to provide a drive signal for powering the field emission lighting arrangement. The drive signal may be provided with a first frequency, where the first frequency is selected to be within a range corresponding to the half power width at resonance of the field emission lighting arrangement. In accordance with the invention, the selection of the first frequency to be such that the half power width at resonance of the field emission lighting arrangement is achieved is understood to mean that the first frequency is selected to be centered around the resonance frequency of the field emission lighting arrangement and having a range such that half of the total power is contained. Put differently, the first frequency is selected to be somewhere within the range of frequencies where drive signal has a power above a certain half the maximum value for its amplitude. This is further discussed in EP09180155, by the applicant, which is incorporated by reference in its entirety.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 1 illustrates the general concept of a field emission cathode according to the invention;

FIGS. 2a and 2b illustrates different conceptual embodiments of the inventive field emission cathode, and FIG. 2c illustrates a detailed view of the field emission cathodes;

DETAILED DESCRIPTION

Figures 3A, 3B:
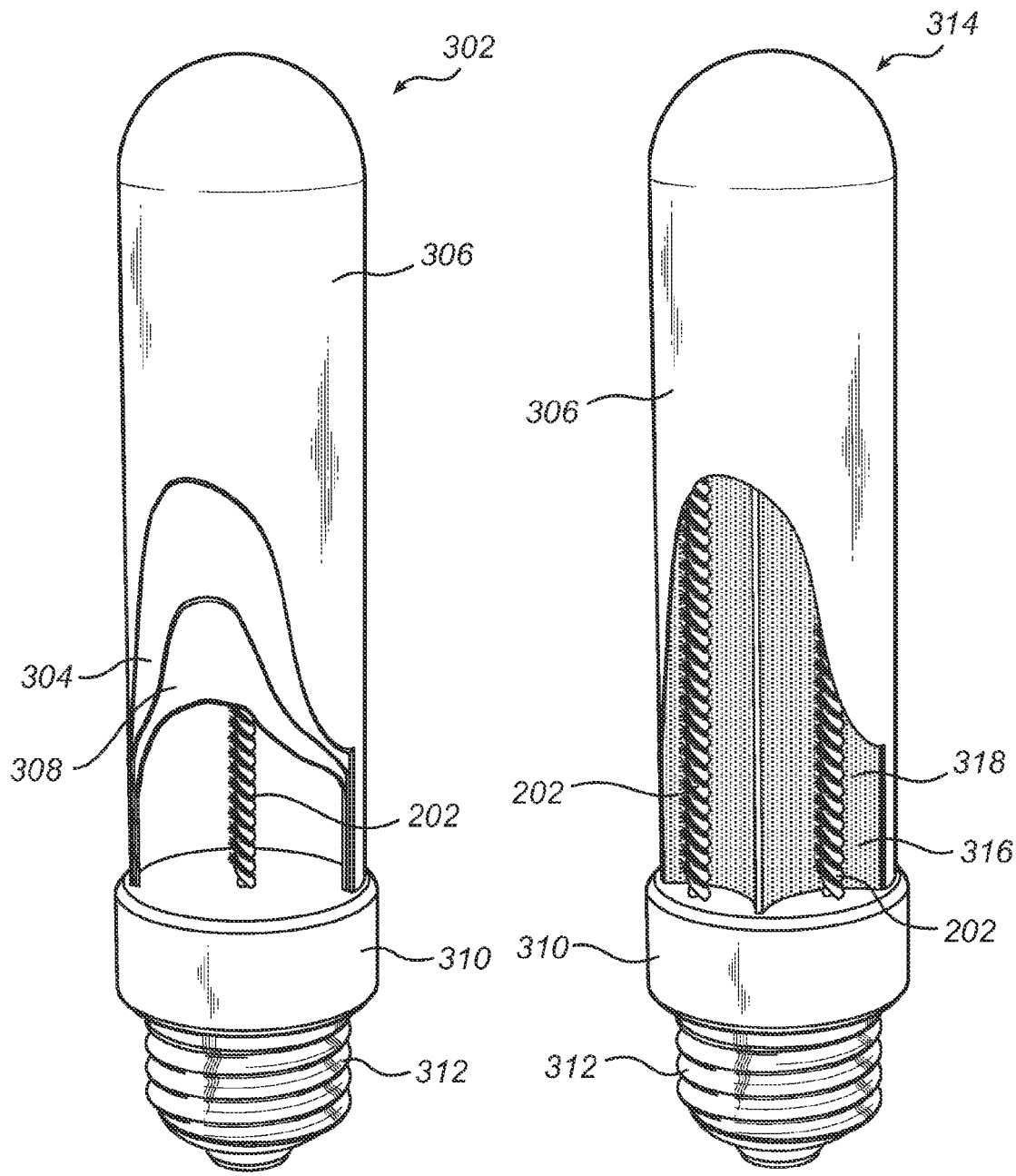
FIGS. 3a and 3b illustrates different embodiments of emission lighting arrangements comprising a field emission cathode according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted the general concept of a field emission cathode 100 according to the invention. The field emission cathode 100 comprises an at least partly electrically conductive base structure 102 and a plurality of electrically conductive and spaced apart micrometer sized sections 104 extending from the base structure 102 and being formed as preferably (but not necessary) polygonal or circular cylinders. At the tips of preferably each of the micrometer sized sections 104 there are provided a plurality of electrically conductive nanostructures 106. Not only the tip of the micrometer sized sections 104 may be provided with the nanostructures 106, e.g. also the sides of the cylinder shaped micrometer sized sections 104 and also possible at the spaces in between the micrometer sized sections 104 (e.g. on the base structure 104).

As discussed above, the micrometer sized sections 104 preferably have a diameter between 5-500 micrometer and a length up to 10 millimeters or at least having an aspect ratio of at least 3:1. The micrometer sized sections 104 may extend at a right angle from the base structure 102, or may as is shown in FIG. 1 extend from the base structure 102 with slightly different angles. The micrometer sized section 104 in itself may also be straight (from a length perspective) and/or slightly bent. Different combinations are of course possible and within the scope of the invention.

The nanostructures 106 are preferably, or at least comprise, ZnO nanostructures and grown on the micrometer sized sections 104 using any one of prior known growth methods suitable in combination with the material selection for the base structure 102 and the micrometer sized sections 104. The nanostructures 106 may also or instead comprise nanostructures of at least one of conductive oxides, borides, nitrides, carbides, metallic alloys, silicides. Additionally, at least a portion the pluralities of nanostructures have a shape of polygonal or circular cylinders, having a diameter between 5-500 nanometer and a length up to 500 nanometers.

FIG. 2 illustrates two conceptual embodiments of a field emission cathode according to the invention. The first embodiment illustrated in FIG. 2a shows a field emission cathode 202 also comprising a base structure 102, in this embodiment in the form of twisted wire 204. In between the twisted wires 204 there are provided a plurality of micrometer sized sections 104, in this embodiment in the form of a plurality of micrometer sized conductive treads 206 (preferably thinner than the twisted wires 204) of for example metal. On the outer tips of the conductive treads 206, there are provided nanostructures, such as ZnO nanostructures 208 (not seen in FIG. 2a).

The second embodiment of a field emission cathode 210 according to the invention as is illustrated in FIG. 2b shows a flat base structure 210 being provided with "clusters" 214 of micrometer sized sections, for example of conductive treads 206, and grouped in 10-100 conductive treads 206. Larger or smaller clusters 214 may of course be provided. Similar to FIG. 2a, the conductive treads 206 of FIG. 2b are provided with ZnO nanostructures 208 (not seen in FIG. 2b). The ZnO nanostructures 208 may however of course extend in different directions.

However, in FIG. 2c there can be seen a detailed view of the ZnO nanostructures 208 being arranged on the tips of the conductive treads 206. As may be seen, the ZnO nanostructures 208 extend in a direction being essentially the same as the extending direction of the micrometer sized sections 206.

It should be noted that the micrometer sized sections 104/206 may at least partly be of the same material as the base structure 102/204/212, and may also be a direct material extension from the base structure 102/204/212. In other embodiments the micrometer sized sections 104/206 may be of other materials than the base structure 102/204/212, where the base structure 102/204/212 for example only partly may be conductive whereas the micrometer sized sections 104/206 are fully conductive. An opposite combination may of course be possible. That is, the base structure 102/204/212 may be comprised of a mixture of conductors and isolators, thereby allowing for e.g. separate clusters of micrometer sized sections 104/206 to be individually addressable and thereby individually controllable in a field emission application.

Turning now to FIGS. 3a and 3b, which illustrates two different conceptual field emission lighting applications according to currently preferred embodiments of the invention, the field emission lighting application 302 illustrated in FIG. 3a is based on the concept of using a transparent field emission anode, such as an ITO layer 304 being provided on a transparent envelope, such as an evacuated cylindrical glass tube 306. For emission of light, a layer of phosphor 308 is provided inside of the ITO layer 304, in the direction towards the above and in relation to FIG. 2a discussed field emission cathode 202. The field emission lighting arrangement 302 further comprises a base 310 and a socket 312, allowing for the field emission lighting arrangement 302 to be used for e.g. retrofitting conventional light bulbs. The base 310 preferably comprises a control unit for providing controlling a drive signals (i.e. high voltage) to the cathode 202.

During operation of the field emission lighting application 302, an electrical field is applied between the cathode 202 and the anode layer, e.g. the ITO layer 304. By application of the electrical field, the cathode 202 emits electrons, which are accelerated toward the phosphor layer 308. The phosphor layer 308 may provide luminescence when the emitted electrons collide with phosphor particles of the phosphor layer 308. Light provided from the phosphor layer 308 will transmit through the transparent ITO/anode layer 304 and the glass cylinder 306. The light is preferably white, but colored light is of course possible and within the scope of the invention. The light may also be UV light.

In the second type of field emission lighting application 314 shown in FIG. 3b, the field emission lighting application 314 similar to the field emission lighting application 302 of FIG. 3a comprises one or a plurality of field emission cathodes 202. The cathode(s) 202 are arranged in a similar evacuated cylindrical glass tube 306 and also comprises a base 310 and a socket 312. However, the concept of the field emission lighting application 314 is based on reflecting light rather than arranging the anode layer to be transparent. Instead, the anode 316 is arranged essentially centrally within the cylindrical glass tube 306 and provided with a reflecting coating (or being comprised of a reflective material, such as comprising a metal or being made of a metal structure). On top of the anode 316, there is then provided a phosphor layer 318 having similar characteristics as the phosphor layer 308 discussed in relations to FIG. 3a. The concept of the reflective anode of the field emission lighting application 314 shown in FIG. 3b is further discussed in detail in the above referenced EP09180339.

Accordingly, during operation of the field emission lighting application 314, the anode 316 is made to reflect light rather than to transmit light as is the case with the field emission lighting application 302 shown in FIG. 3a. This may for example allow for high heat dissipation during operation. The heat will be conducted away from the anode 316 to an anode contact acting as a thermal bath.

Figure 4:
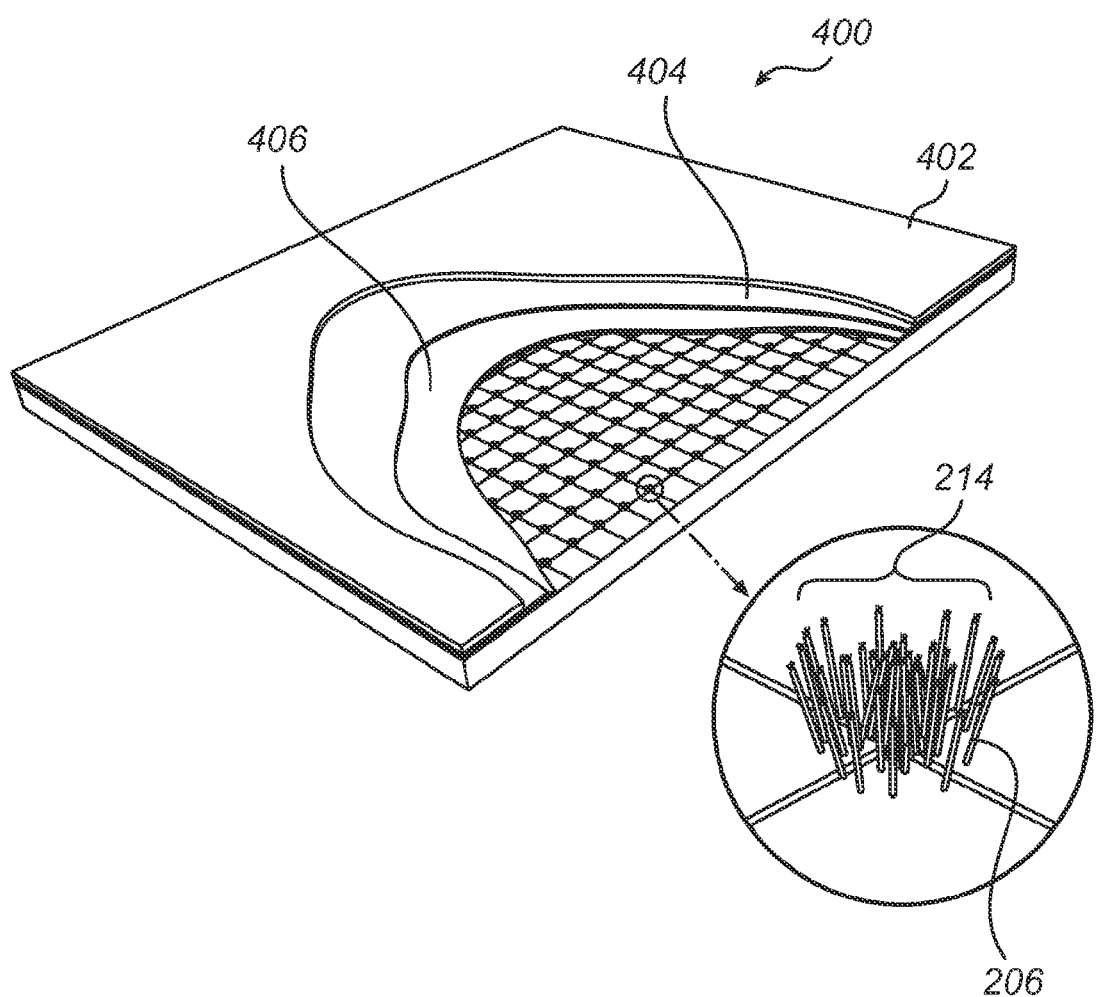
FIG. 4 illustrates another embodiment of a field emission lighting arrangement.

Finally, in FIG. 4 there is depicted a conceptual flat field emission lighting arrangement 400 comprising a field emission cathode being based on the concept shown in relation to FIG. 2b. In essence, the flat field emission lighting arrangement 400 comprises the layered structure as is shown in FIG. 3a, e.g. comprising a transparent layer, such as a glass layer 402 (materials having similar characteristics are of course possible and within the scope of the invention), a transparent anode layer, such as an ITO layer 404 and a phosphor layer 406.

The field emission cathode may comprise a conductive and possibly addressable matrix base structure where there are arranged a plurality of clusters 214 of micrometer sized sections 206 provided in a similar manner as in relation to FIG. 2b. The micrometer sized sections 206 are in turn provided with a plurality of nanostructures, for example comprising ZnO nanostructures.

The operation of the flat field emission lighting arrangement 400 is similar to the field emission lighting arrangement 302 of FIG. 3a, however, the phosphor layer may be sectioned and of comprising different types of phosphor emitting light of different color. Also, as mentioned, base structure may be of an addressable matrix type and may together with the sectioned phosphor layer 406 may be used for emitting lights of different color, for example simultaneously. Accordingly, the flat field emission lighting arrangement 400 may be used as a multi color display.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:
1. A field emission cathode, comprising:
an at least partly electrically conductive base structure; and
a plurality of electrically conductive micrometer sized sections spatially distributed at the base structure,
wherein
at least a portion of the plurality of micrometer sized sections has a shape of polygonal or circular cylinders, an aspect ratio of at least 3:1, a diameter between 5-500 micrometers, and a length up to 10 millimeters,
at least a portion of the plurality of micrometer sized sections each are provided with a plurality of electrically conductive nanostructures, the nanostructures including a nanowire having a length greater than 1000 nm and an aspect ratio greater than 20:1, and the nanostructures are provided on the outer tips of the micrometer sized sections.

2. The field emission cathode according to claim 1, wherein the nanostructures comprises nanostructures of at least one of conductive oxides, borides, nitrides, carbides, metallic alloys, silicides.

3. The field emission cathode according to claim 1, wherein the nanostructures comprises ZnO nanostructures.

4. The field emission cathode of claim 1, wherein the plurality of electrically conductive nanostructures are concentrated at distal ends of the plurality of electrically conductive micrometer sized sections.

5. The field emission cathode according to claim 1, wherein the base structure comprises a wire.

6. The field emission cathode according to claim 1, wherein the base structure comprises at least one of a grid, and a perforated or solid thin sheet.

7. The field emission cathode according to claim 1, wherein the micrometer sized sections are distributed with a distance exceeding an average diameter of the plurality of micrometer sized sections.

8. The field emission cathode of claim 1, wherein the base structure is in a form of a twisted wire.

9. The field emission cathode according to claim 1, wherein at least a portion of the plurality of micrometer sized sections comprises an electrically conducting or semiconducting, optically transparent or reflecting material.

10. A field emission arrangement, comprising:
a field emission cathode comprising:
an at least partly electrically conductive base structure;
a plurality of electrically conductive micrometer sized sections spatially distributed at the base structure,
wherein at least a portion of the plurality of micrometer sized sections each are provided with a plurality of electrically conductive nanostructures;
an anode structure; and
an evacuated envelope inside of which the anode structure and the field emission cathode are arranged.

11. The field emission arrangement of claim 10, wherein at least a portion of the plurality of nanostructures have a shape of polygonal or circular cylinders, having a diameter between 5-500 nanometers and a length up to 500 nanometers.

12. The field emission arrangement according to claim 10, wherein the anode structure is at least partly covered by a phosphor layer and the anode structure comprises a thermally conductive material having a reflective coating.

13. The field emission arrangement according to claim 10, wherein the anode structure is configured to receive electrons emitted by the field emission cathode when a voltage is applied between the anode structure and field emission cathode and to reflect light generated by the phosphor layer out from the evacuated envelope.

14. The field emission arrangement according to claim 10, further comprising a power supply connected to the field emission cathode and the anode structure and configured to provide a drive signal for powering the field emission arrangement, the drive signal having a first frequency, wherein the first frequency is selected to be within a range corresponding to a half power width at resonance of the field emission arrangement.

15. The field emission arrangement according to claim 10, wherein the field emission arrangement is comprised in at least one of a field emission light source, a field emission display, and an X-ray source.

16. The field emission arrangement of claim 10, wherein the base structure comprises at least one of a wire, a grid, and a perforated or solid thin sheet.

17. The field emission arrangement of claim 10, wherein the micrometer sized sections are distributed with a distance exceeding an average diameter of the plurality of micrometer sized sections.

18. The field emission arrangement of claim 10, wherein at least a portion of the plurality of micrometer sized sections have a shape of polygonal or circular cylinders, having a diameter between 5-500 micrometers and a length up to 10 millimeters.

19. The field emission arrangement of claim 10, wherein at least a portion of the plurality of micrometer sized sections comprises an electrically conducting or semiconducting, optically transparent or reflecting material.

* * * * *